United States Patent
Grigorian (10) Patent No.: US 6,724,432 B2
(45) Date of Patent: Apr. 20, 2004

(54) APPARATUS AND METHOD FOR TRANSMITTING AUDIO OVER A DEDICATED VIDEO LINE

(75) Inventor: Samuel N. Grigorian, Fresno, CA (US)

(73) Assignee: Pelco, Clovis, CA (US)

( * ) Notice: Subject to any disclaimer, the term of this patent is extended or adjusted under 35 U.S.C. 154(b) by 341 days.

(21) Appl. No.: 09/775,512

(22) Filed: Feb. 2, 2001

(65) Prior Publication Data

US 2002/0008778 A1 Jan. 24, 2002

Related U.S. Application Data (60) Provisional application No. 60/180,424, filed on Feb. 4, 2000.

(51) Int. Cl.⁷ .......................... H04N 7/08; H04N 5/455; H04N 5/268; H04N 5/40
(52) U.S. Cl. ...................... 348/484; 348/485; 348/705; 348/706; 348/724; 348/726
(58) Field of Search .................. 348/484, 485, 348/192, 194, 473, 461, 462, 515, 705, 706, 725, 726, 723, 724, 727, 728; 725/74, 135, 138, 144, 143, 148, 153; 386/86, 117; 700/94; H04N 11/00, 7/00, 7/08, 9/475

(56) References Cited

U.S. PATENT DOCUMENTS

| | | | | |
|---|---|---|---|---|
| 4,479,150 A | * | 10/1984 | Ilmer et al. | 348/480 |
| 4,665,431 A | * | 5/1987 | Cooper | 348/480 |
| 4,855,827 A | * | 8/1989 | Best | 348/485 |
| 5,842,171 A | | 11/1998 | Greenwood et al. | |
| 5,929,922 A | | 7/1999 | Stevens et al. | |
| 5,940,070 A | | 8/1999 | Koo | |
| 6,040,870 A | * | 3/2000 | Small | 348/476 |

FOREIGN PATENT DOCUMENTS

| | | | |
|---|---|---|---|
| EP | 0051740 | * | 5/1982 |
| EP | 0509390 | * | 10/1992 |
| JP | 410093977 | * | 4/1998 |

* cited by examiner

Primary Examiner—Sherrie Hsia
(74) Attorney, Agent, or Firm—Mark D. Miller (57) ABSTRACT

Disclosed is a method and apparatus for transmission of audio signals over a dedicated video transmission line in which the analog audio signal is inserted into and becomes a part of the video signal. Samples of the audio signal are inserted into the active video line, either at the beginnings or endings, or both, of each active video line scan signal. A defined amount of the active video interval is reserved from the active video line, and is replaced with samples of the analog audio signal. An analog switch in the modulator of the invention toggles to pick up the samples of audio and place them at the designated location (either at the beginnings or at the ends) of each active video line scan signal. A corresponding switch in the demodulator of the invention toggles to retrieve the audio samples from the active video line scans for output to the user. Stereo and/or bi-directional audio signals can be transmitted by insertion into both the beginnings and the endings of the active video line scan signals.

19 Claims, 13 Drawing Sheets

Simplified Block Diagram

APPARATUS AND METHOD FOR TRANSMITTING AUDIO OVER A DEDICATED VIDEO LINE

This application claims the benefit of provisional application No. 60/180,424 filed Feb. 4, 2000.

BACKGROUND OF THE INVENTION

1. Field of the Invention

This invention relates to a method and system for transmitting audio signals over a dedicated video signal line, and particularly relates to a simple and inexpensive method and system for transmitting analog audio signals over a dedicated video line within the normal video area of the NTSC or PAL/SECAM signal.

2. Description of the Prior Art

Methods and systems for transmitting audio signals over dedicated video signal lines are in existence. However, presently existing systems use parallel (additional) audio channel or a digital technique to transmit digital audio signals within the various synchronizing signals of the video picture signal. As examples, the invention of U.S. Pat. No. 5,842,171 teaches the encoding of digital audio into a SMPTE digitized video signal as a burst of digital data that fits into a specified time slot of the SMPTE standard. The invention of U.S. Pat. No. 5,929,922 teaches the sending of digital audio inside television vertical blanking intervals. The invention of U.S. Pat. No. 5,940,070 refers to a method of sending digitized audio over one of the video lines of a standard VGA display system, with synchronization data coming over a separate line. Each of these systems requires digital-to-analog (DTA) converters and analog-to-digital (ATD) converters in order to convert the particular audio signal into a useable format, and one requires an additional transmission line. In addition, while inserting additional information into the video signals during the video blanking periods is well known, this technique typically violates the TV video signal standard, frequently resulting in visible retraces on the video screen.

It is therefore desirable to provide a simple method and apparatus for sending audio signals along a line dedicated to video without the need for either a separate communication line, or the need for cumbersome DTA/ATD converters and buffering systems at either end of the line.

SUMMARY OF THE INVENTION

The present invention provides a method and apparatus for transmission of analog audio signals over a dedicated video communication line, wherein the analog audio signal is inserted into and becomes a part of the video signal. The analog audio signal can be inserted into a defined amount of active video interval (bandwidth) reserved from the active video line, either at the beginnings or endings of the active video line scan signal, or at both the beginnings and endings of the video line scan signal for transmission of two audio signals (e.g., for stereo audio, or for bi-directional (duplex) audio communication in closed circuit television (CCTV) applications). A defined amount of active video interval (bandwidth) is reserved from the active video line, and is replaced with samples of the analog audio signal. The analog audio signal samples are inserted at either the beginnings or endings, or both, of the active video line scan signal, because the beginnings and endings of the active video ordinarily occur outside the actual boundaries of the video picture, i.e., within the vertical black borders of the video screen which in most cases will be undetected due to the common practice of allowing the monitors to overscan.

It is therefore a primary object of the present invention to provide a method and apparatus for transmitting an analog audio signal as part of the active video line scan signal through a single communication line.

It is also an important object of the present invention to provide a method and apparatus for inserting samples of an analog audio signal at either the beginnings or the endings of each active video line scan signal transmitted through a single communication line.

It is also an important object of the present invention to provide a method and apparatus for transmitting a pair of audio signals as part of the active video line scan signal through a single communication line.

It is also an important object of the present invention to provide a method and apparatus for inserting samples of a pair of analog audio signals as part of the active video line scan signal, one set of audio signal samples at the beginnings, and the other set of audio signal samples at the endings of each active video line scan signal transmitted through a single communication line.

Additional objects of the invention will be apparent from the detailed descriptions and the claims herein.

DETAILED DESCRIPTION OF THE PREFERRED EMBODIMENT

Figure 1:
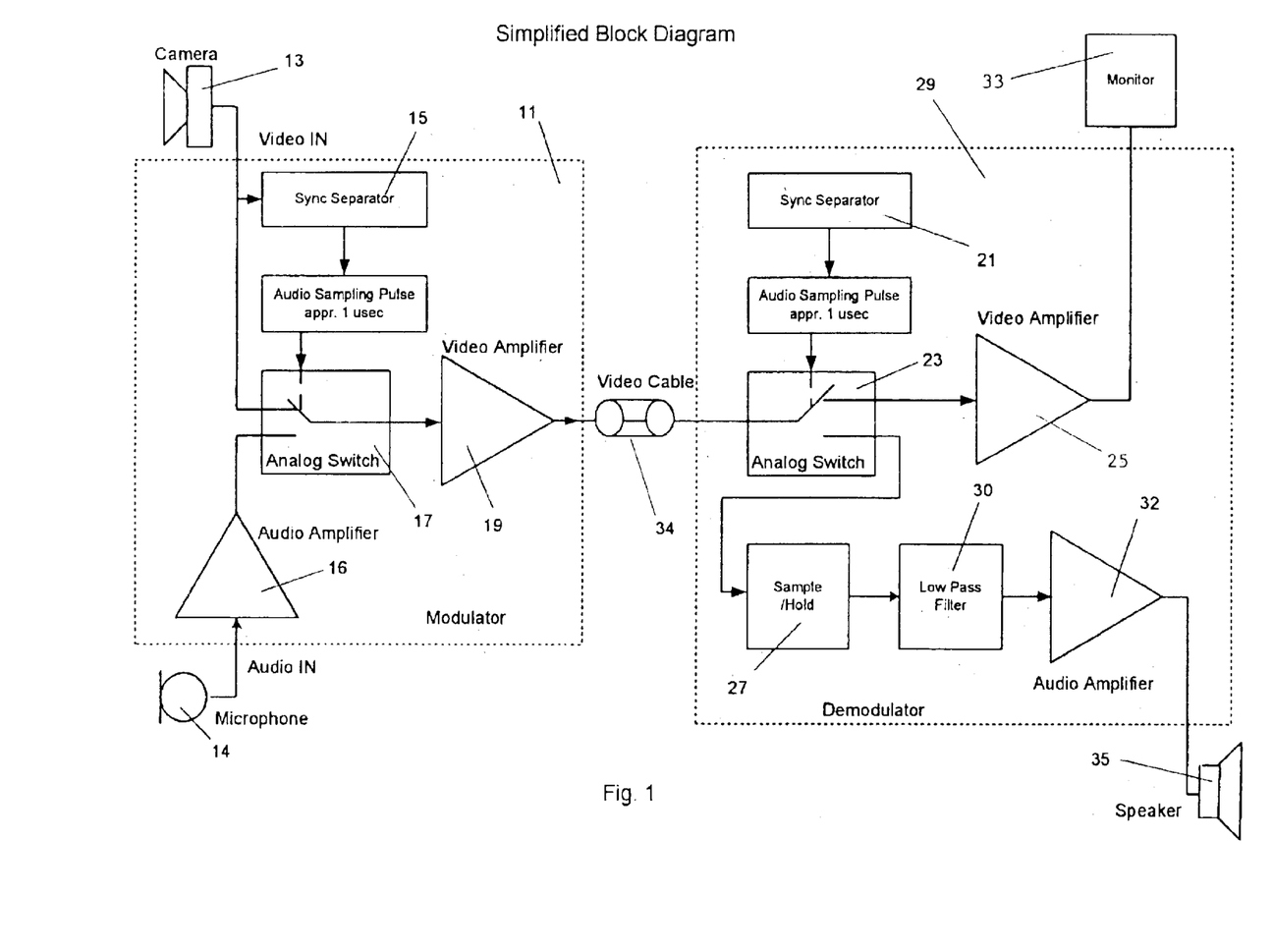
FIG. 1 is a simplified block diagram of the video and audio processing equipment (modulator and demodulator) of the system of the present invention.

Referring to the drawings wherein like reference characters designate like or corresponding parts throughout the several views, and referring particularly to the simplified block diagram of FIG. 1 it is seen that the invention generally includes a modulator 11 and a demodulator 29 connected by a single suitable cable (e.g. coaxial cable) 34. With reference to the modulator 11, an analog video signal enters modulator 11 from a video input such as a camera 13. Blanking period synchronization (sync) pulses are created by synchronization separator 15. Any suitable pulse frequency may be established which is defined by the bandwidth of the transmitting video (starting from 0.2 microseconds for the standard NTSC video). In the preferred embodiment, a pulse establishing an interval of approximately one (1) microsecond is used. The video signal and sync pulses pass into to a video/audio analog switch 17 described more fully below.

Simultaneous with the video signal, an audio signal from an audio input such as a microphone 14 enters modulator 11 where it passes through an amplifier 16 on its way to analog switch 17. For most of the pulse interval, switch 17 is toggled to transmit the video signal from camera 13. However, once (or twice, depending upon whether one or two audio signals are to be transmitted) during each video line, switch 17 toggles to transmit a sample of the audio signal output from amplifier 16, according to the sync pulses created by separator 15. Thus, sync separator 15 creates audio sampling pulses which trigger analog switch 17 to insert the sample of the analog audio signal on each video signal line scan. As described more fully below, the audio sample may be inserted at the start or at the end of the video signal line, or at both the start and the end of the line, if two signals are to be transmitted. The combined video and samples of audio signal is further amplified at amplifier 19 and sent along the video cable 34 to the demodulator 29 for separation and distribution to the video monitor 33 and audio speaker 35.

Within the demodulator 29, an identical blanking period synchronization signal is generated by sync separator 21 as by separator 17. This signal is similarly used to create the audio sampling pulse which triggers analog video/audio switch 23 to extract the analog audio signal after the blanking period at the start or end (or both) of each active video line scan. The video signal, with the audio removed, is then sent through a video amplifier 25 to the monitor 33. The samples of extracted analog audio signal are maintained at a constant level between samples by a holding device 27. The signal is then filtered at 30, amplified at 32, and sent to the audio speaker 35.

Figure 2:
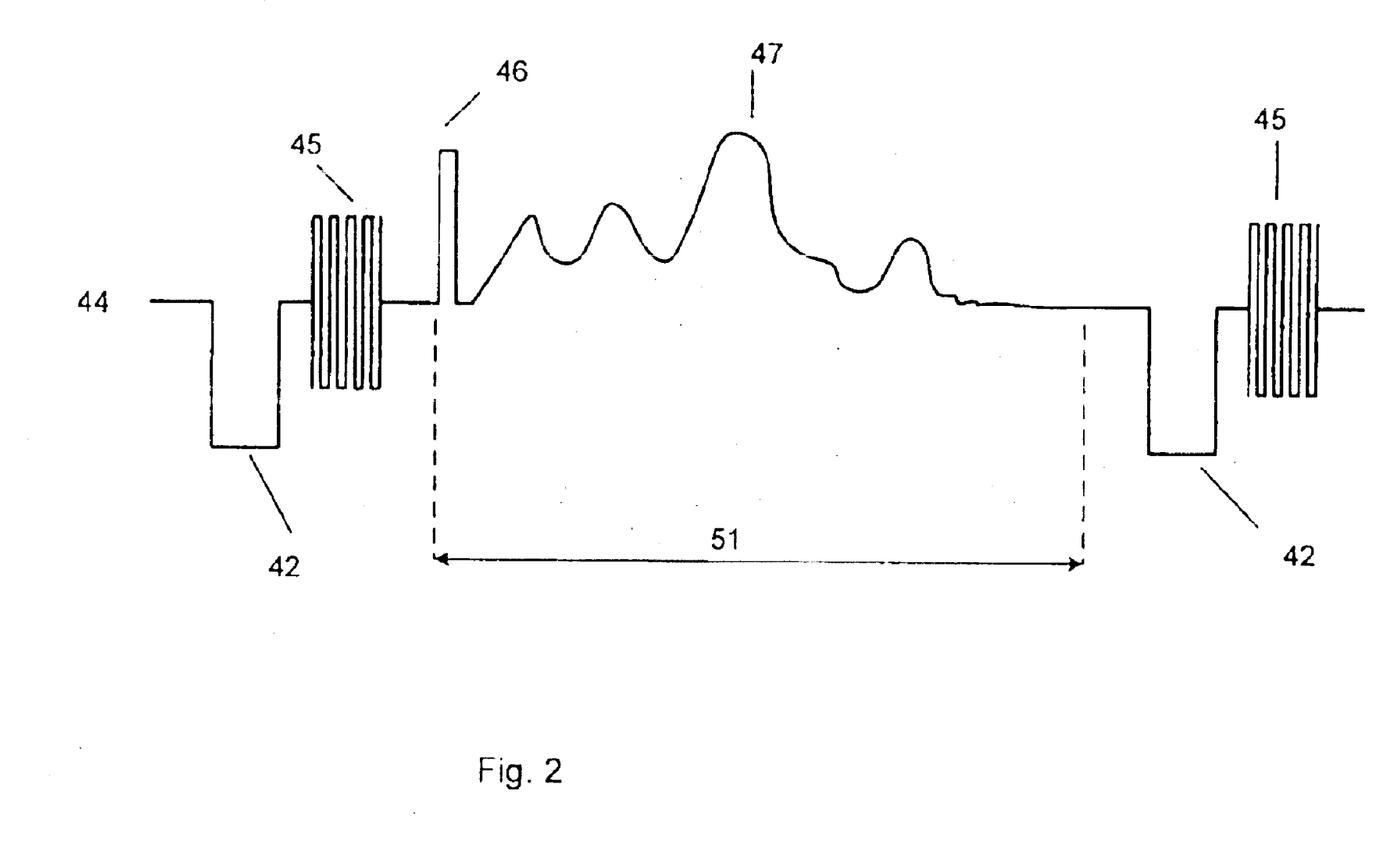
FIG. 2 is a waveform diagram of an analog video signal illustrating the analog audio inserted into the start of the video signal.

The insertion of a sample analog audio signal onto a single active video scan line inside modulator 11 is shown in FIGS. 2–6. FIG. 2 is a general waveform diagram of a video signal 44 showing a sample analog audio signal 46 inserted at the beginning of the active video line scan signal 51. The synchronization signal 42 triggers the sample insertion signal to reserve (remove) the defined amount of active video interval (bandwidth) from the active video line following a color burst 45, and replace it with the analog audio signal to be inserted into the active video bandwidth immediately following the start of the active video line scan signal. This is accomplished by the brief toggling of switch 17 from the video to the audio signal and back to the video signal.

Figure 3:
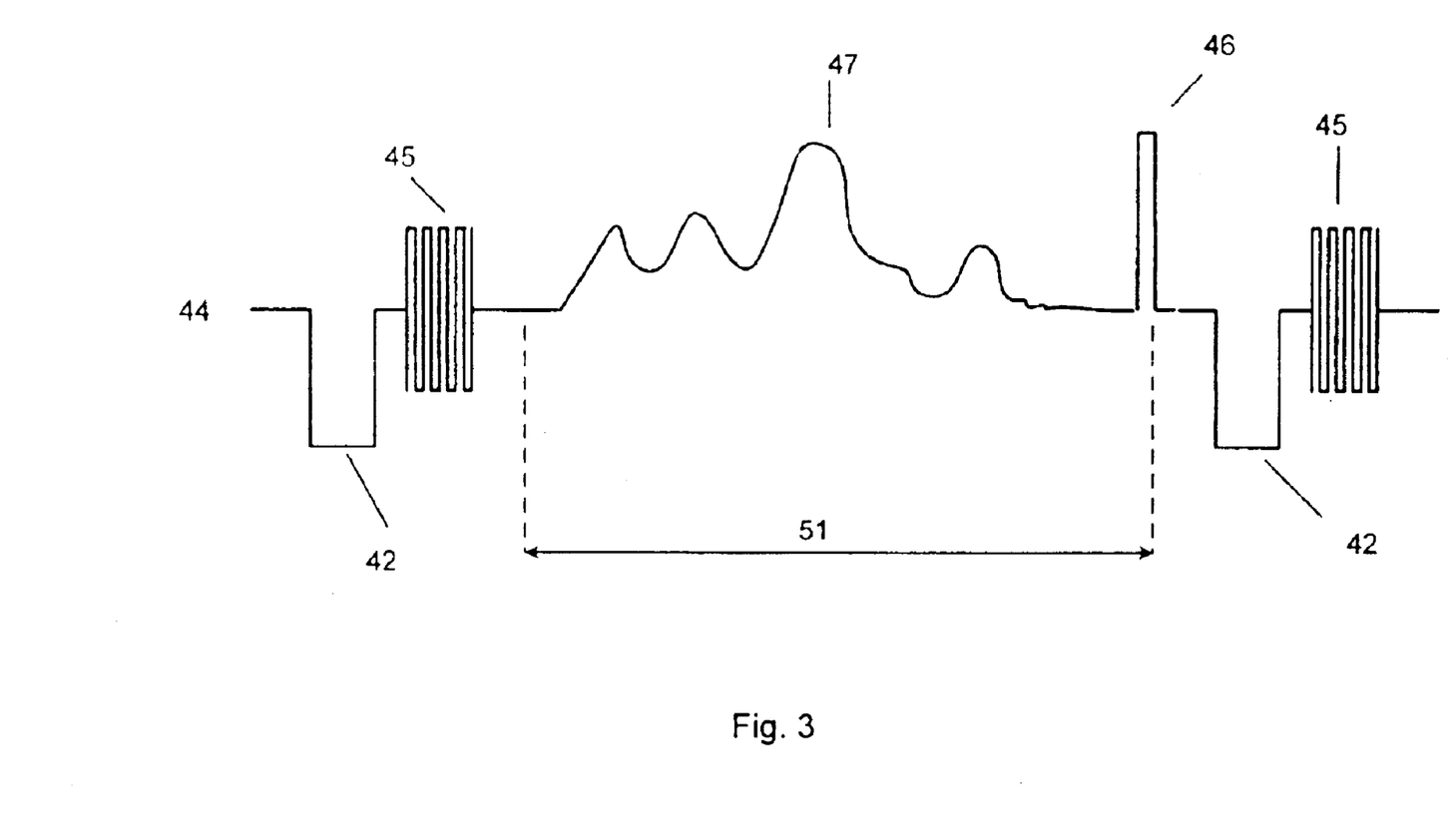
FIG. 3 is a waveform diagram of an analog video signal illustrating the analog audio inserted into the end of the video signal.

The reverse of this process occurs inside demodulator 29 wherein the synchronization signal 42 triggers switch 23 to remove the analog audio signal 46 from the designated location on the active video line scan signal 51. In FIG. 2, this location is at the start of the active video line scan signal. In FIG. 3, this location is at the end of the active video line scan signal.

Both the modulator 11 and demodulator 29 can be adjusted to place the analog audio signal at any point on the active video line scan signal. It is preferred to place the analog audio signal at either the very beginning or the very end of the active video line scan signal in order to slightly crop the edges of the transmitting image. Typically, because the beginning and ending portions of the video line scan signal are beyond the boundaries of the actual video image being transmitted, these areas fall out of the actual boundaries of the CRT tube because of common practice of overscaning. Accordingly, placing the analog audio signal in these locations is less likely to affect the viewing video image.

Figure 4:
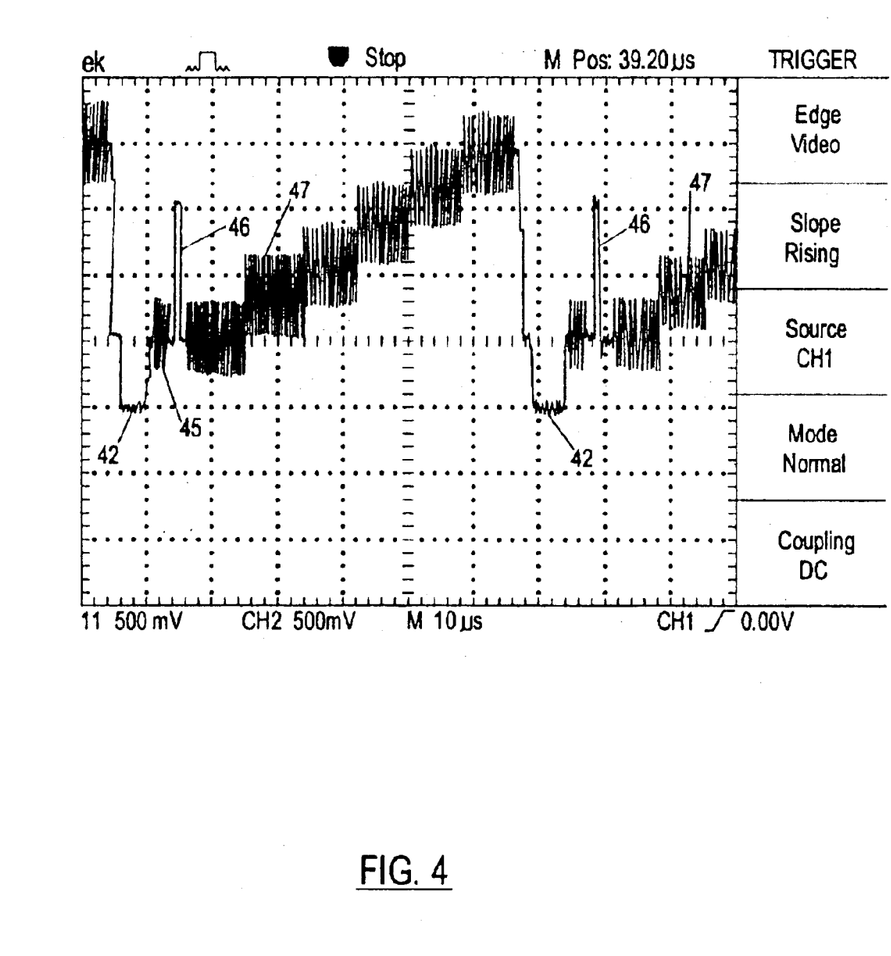
FIG. 4 is a waveform taken from an oscilloscope screen illustrating the analog audio inserted into the start of the video signal.

FIG. 4 illustrates a video waveform taken from an oscilloscope video showing the synchronization pulse 42, followed by a color burst 45, followed by the inserted sample analog audio signal 46, followed by the analog video signal 47, followed by the subsequent synchronization pulse 42. As illustrated, the inserted analog audio signal 46 can be considerably smaller (in bandwidth) than the video line scan synchronization signal 42.

Figure 5:
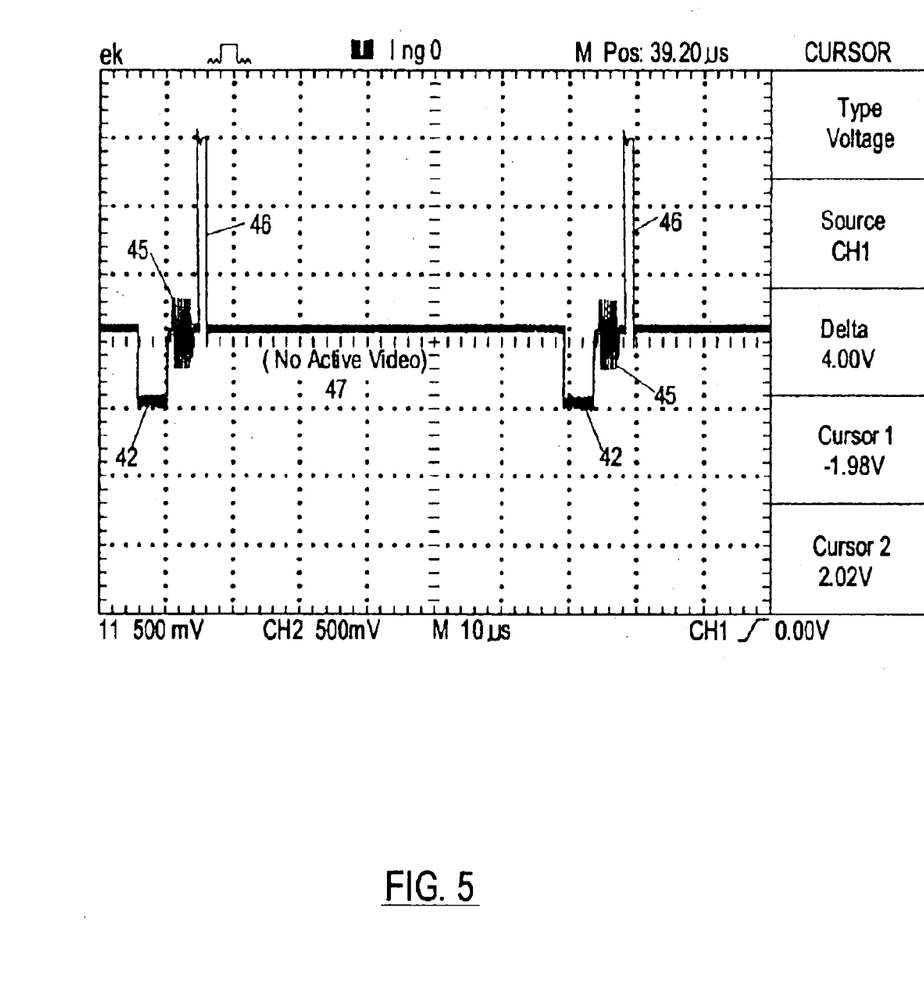
FIG. 5 is a waveform taken from an oscilloscope screen illustrating the analog audio inserted into the start of the video signal, wherein there is a black video signal.

FIG. 5 illustrates a video waveform taken from an oscilloscope video showing the synchronization pulse 42, followed by a color burst 45, followed by the inserted sample analog audio signal 46, followed by the interval occupied by analog video signal 47, but wherein there is no active signal, followed by the subsequent synchronization pulse 42. It is to be noted that an active video signal 47 is not required to transmit the audio samples 46.

Figure 6:
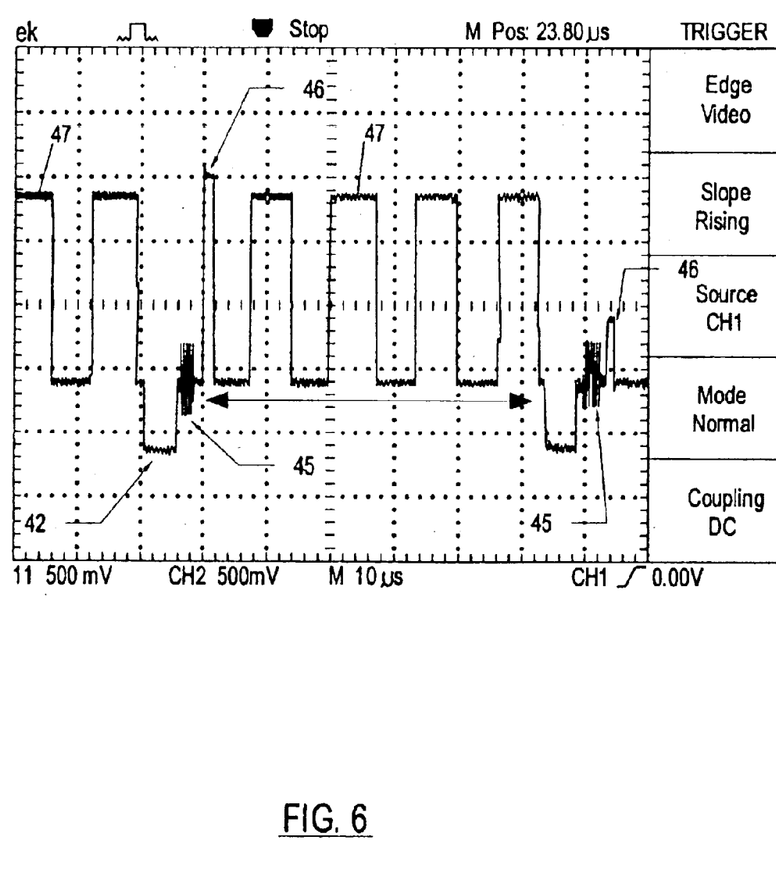
FIG. 6 is a waveform taken from an oscilloscope screen similar to FIG. 3, illustrating the analog audio inserted into the start of a pattern video signal.

FIG. 6 illustrates the video waveform taken from an oscilloscope video showing the synchronization pulse 42, followed by a color burst 45, followed by the inserted sample analog audio signal 46, followed by a square wave analog video signal 47, followed by the subsequent synchronization pulse 42.

FIGS. 4–6 illustrate that the analog audio signal samples 46 can be inserted into various configurations of video signals 47, and even into a black video (FIG. 5). In addition, the analog audio signal samples 46 can be inserted into the active video interval (bandwidth) reserved from the active video line, either at the beginnings (FIG. 2) or endings (FIG. 3) of the active video line scan signal, and shown for various standard patterns of video signals.

Figure 7:
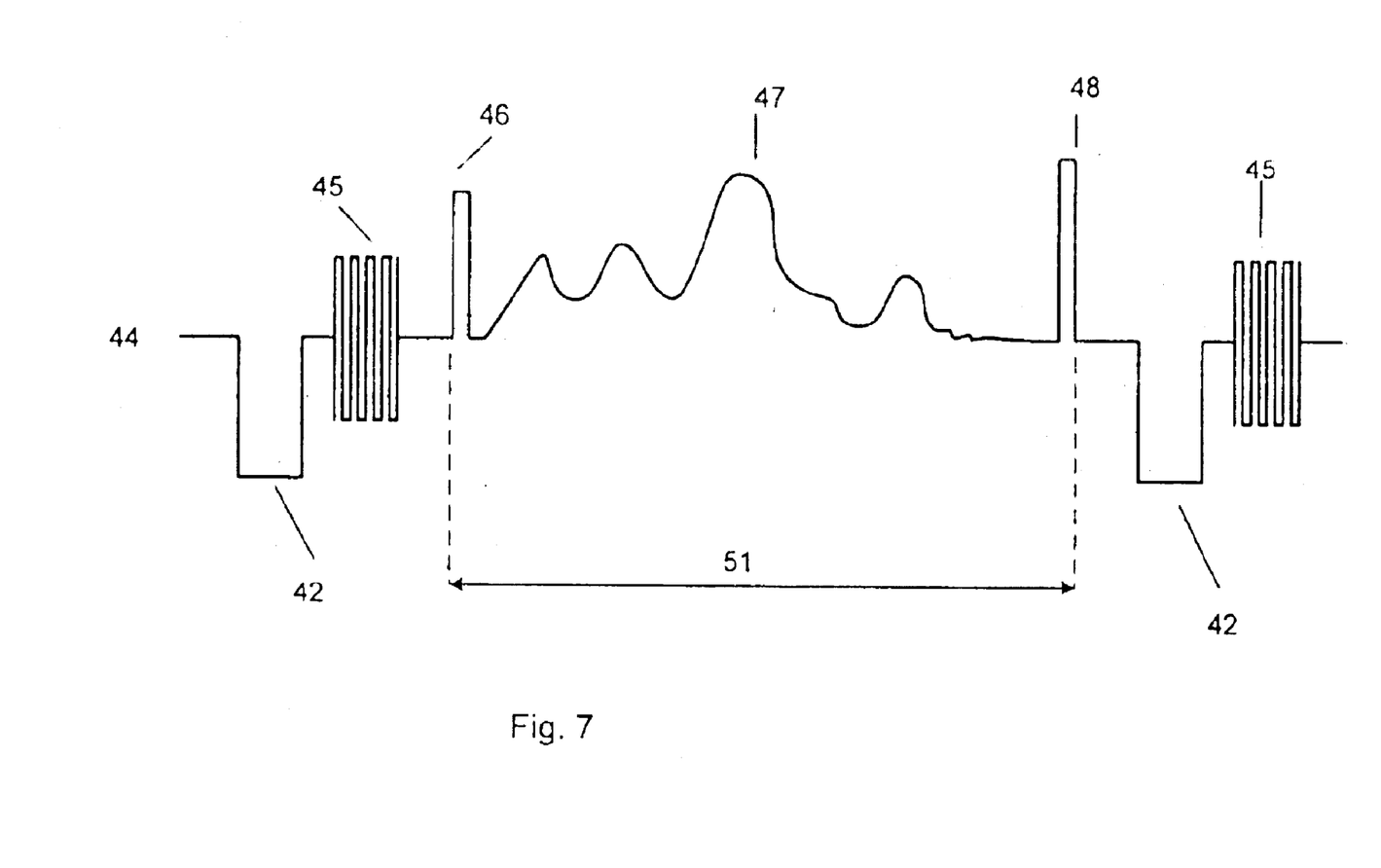
FIG. 7 is a waveform diagram of an analog video signal illustrating the insertion of dual audio samples, one at the beginning and one at the end of video signal.
Figure 8:
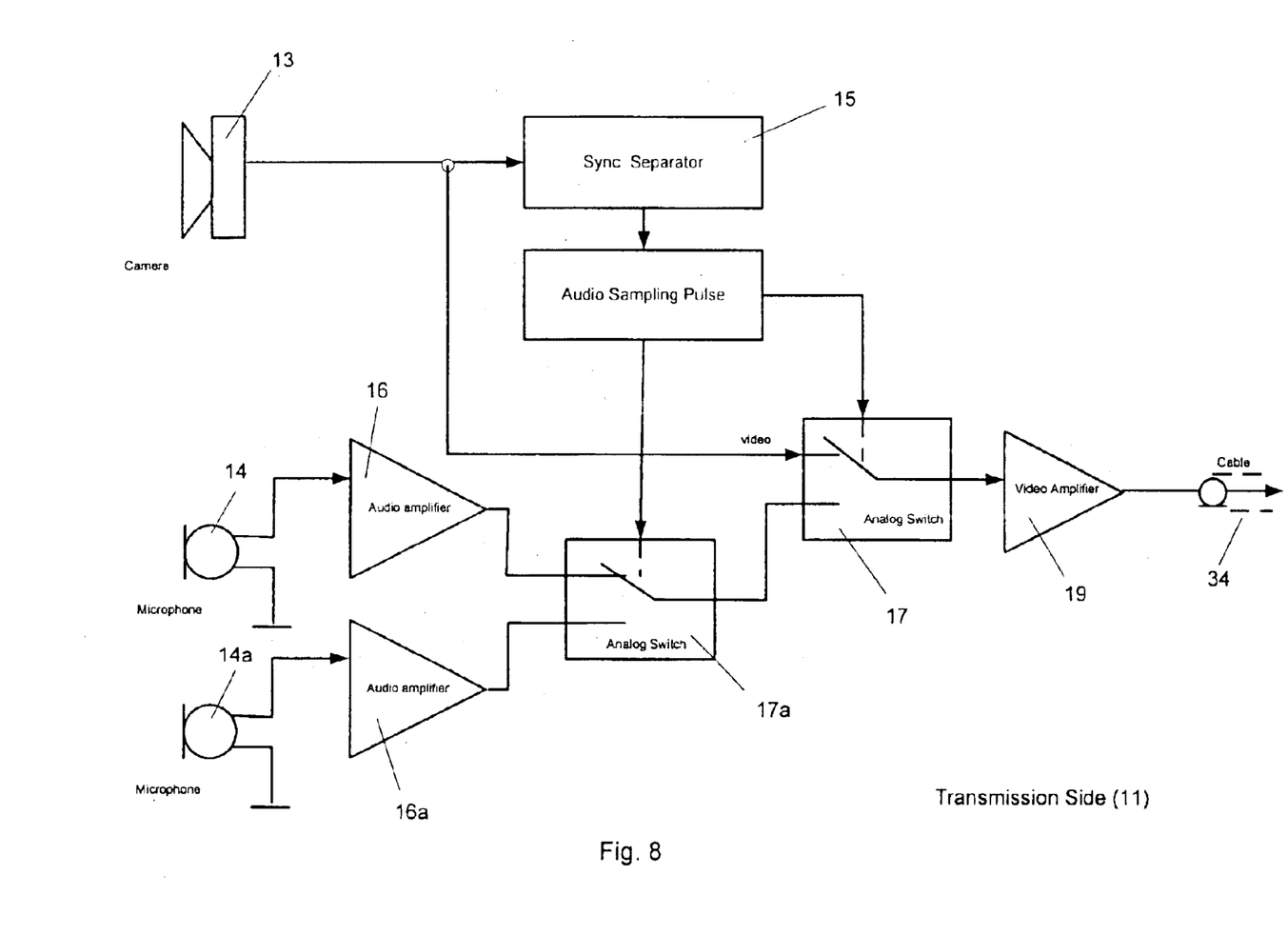
FIG. 8 is a simplified block diagram of the modulator (transmission side) of the system of the present invention illustrating a dual audio input embodiment.
Figure 9:
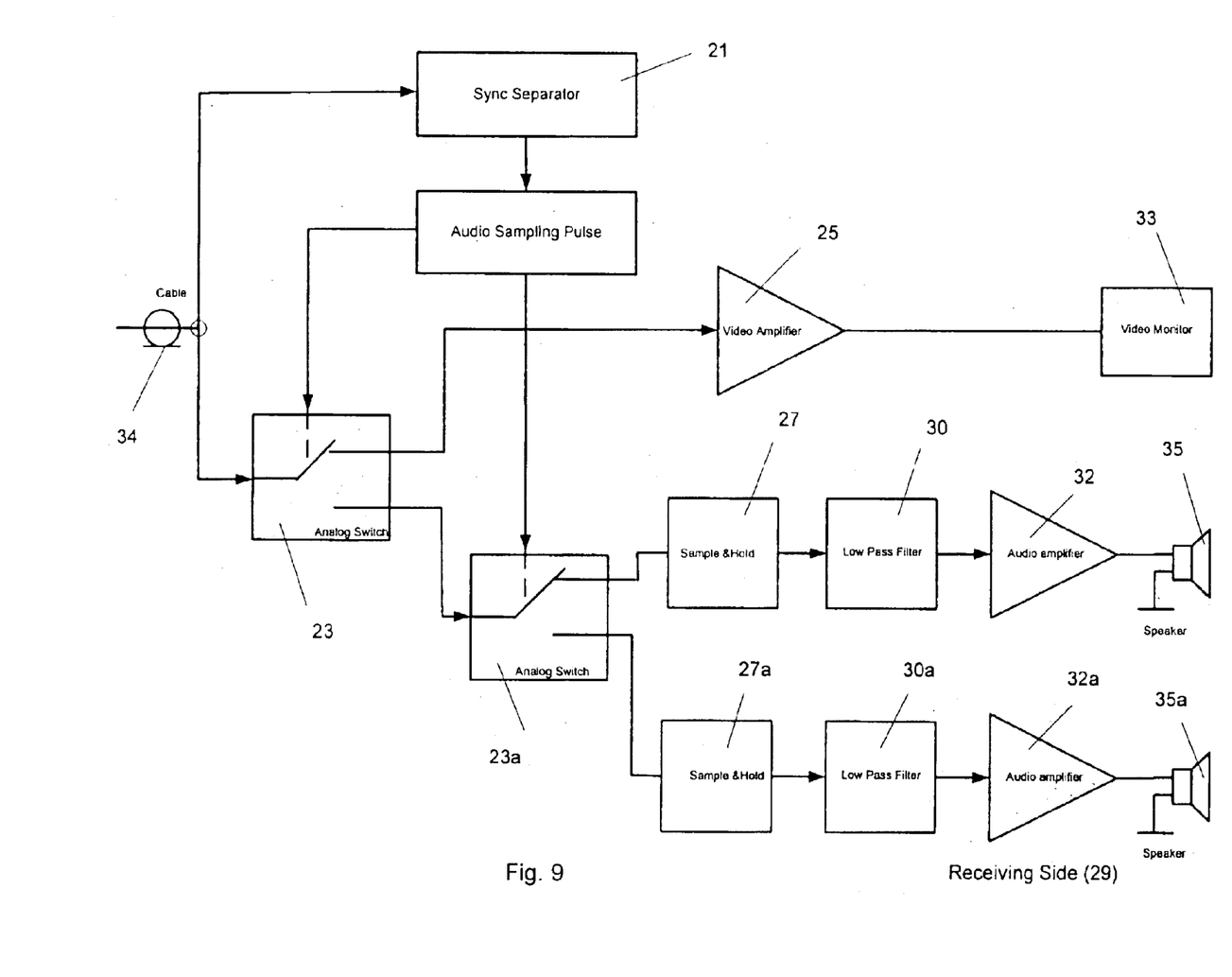
FIG. 9 is a simplified block diagram of the demodulator (receiving side) of the system of the present invention illustrating a dual audio output embodiment.

Dual audio signals can be transmitted by inserting a sample analog audio signal at both the beginning and at the end of each active video signal line scan as shown in FIG. 7. A first audio signal sample 46 is inserted at the beginning of the active video line, and a second audio signal sample 48 is inserted at the end of the same active video line. In this embodiment, a duplicate set of audio components (designated by the suffix "a") are provided. Hence, a second identical audio source 14a, amplifier 16a, and switch 17a are provided in modulator 11 as shown in FIG. 8; and a second identical switch 23a, hold 27a, filter 30a, amplifier 32a and speaker 35a are provided in demodulator 29 as shown in FIG. 9. Switches 17a and 23a are configured such that they toggle at the appropriate time pick up the second audio sample on each active video line. In this way, a stereo audio signal may be transmitted through cable 34.

Figure 10:
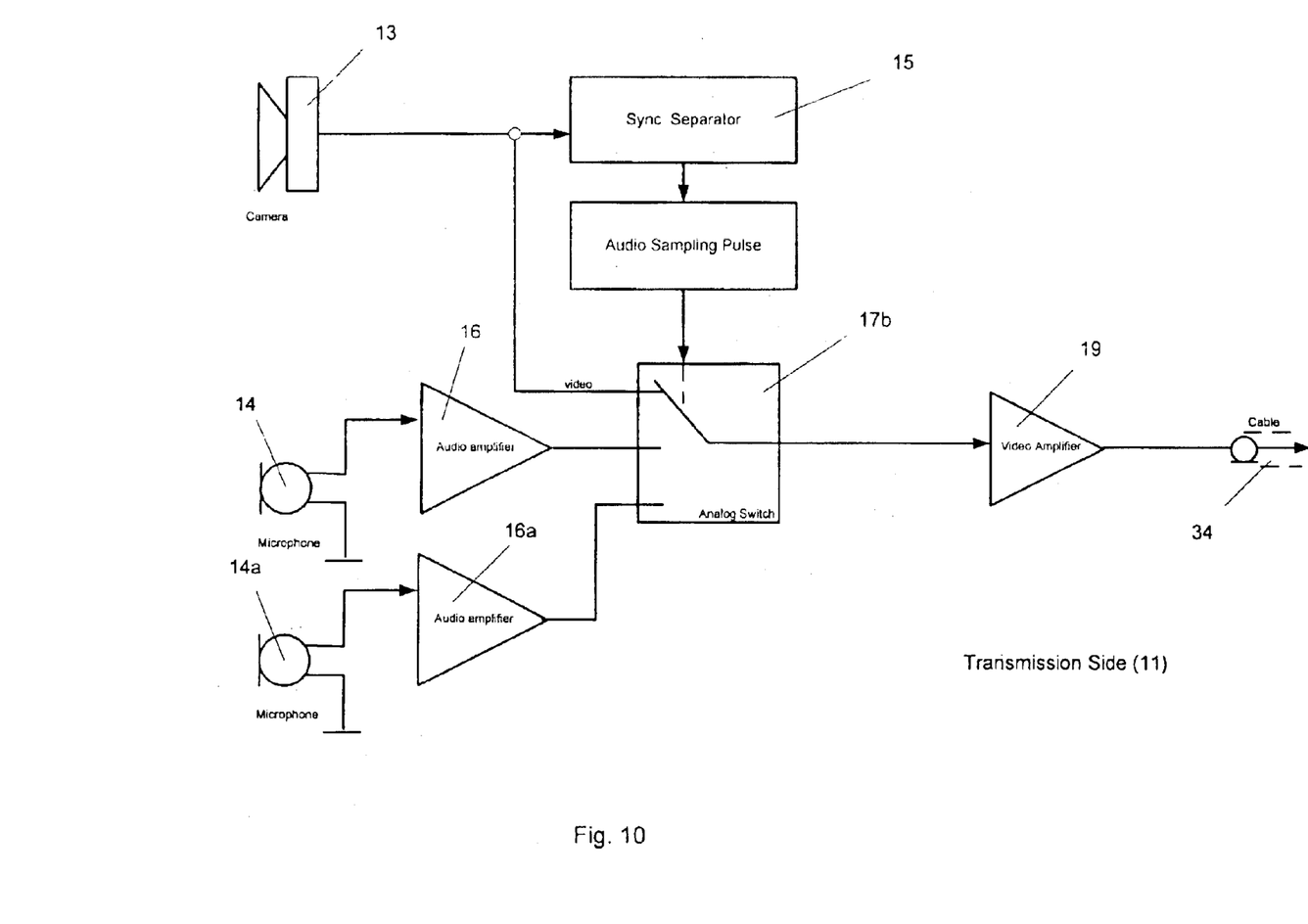
FIG. 10 is a simplified block diagram of the modulator (transmission side) of the system of the present invention illustrating another dual audio input embodiment.
Figure 11:
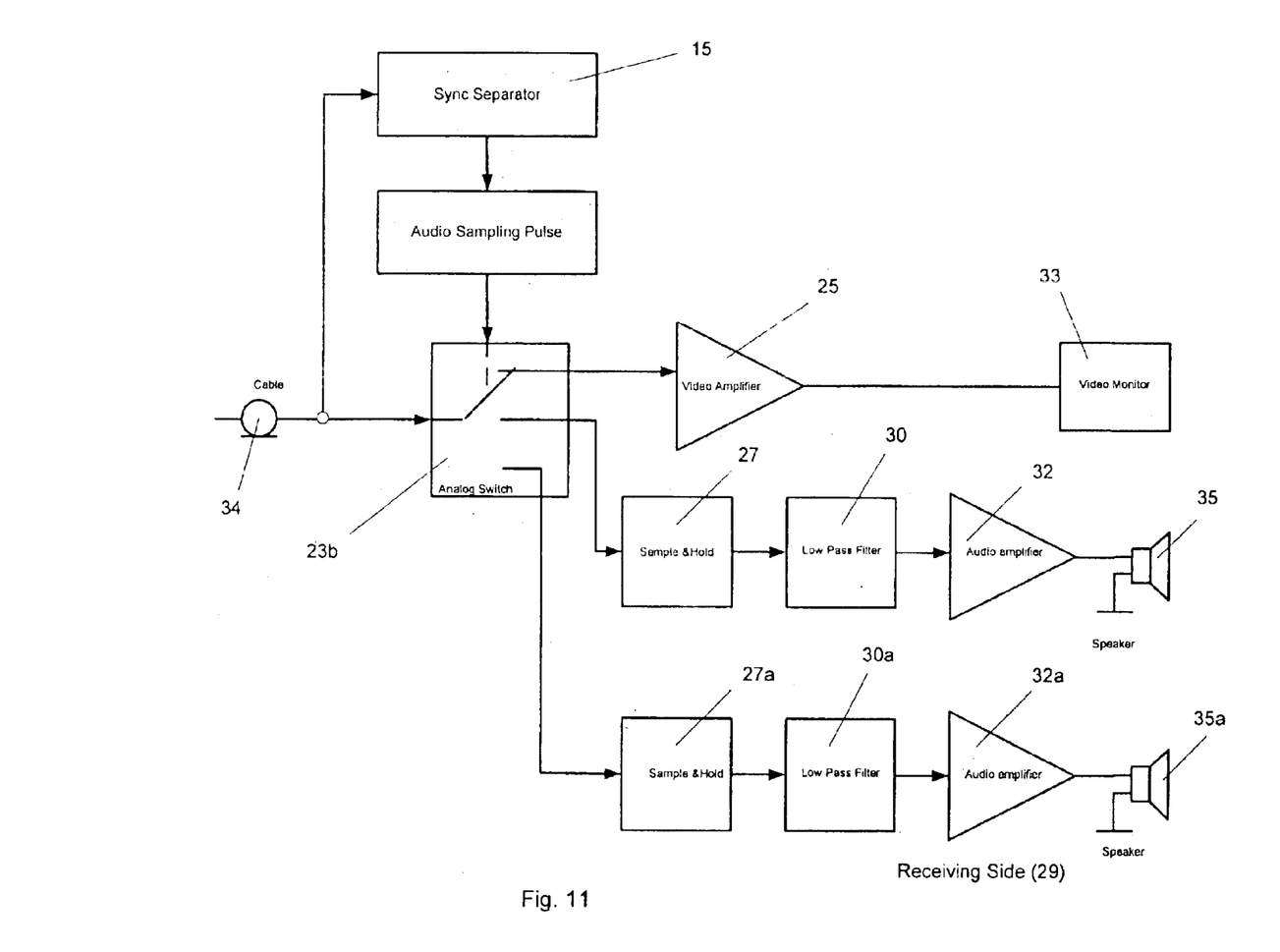
FIG. 11 is a simplified block diagram of the demodulator (receiving side) of the system of the present invention illustrating another dual audio output embodiment.

In a variation of the dual/stereo embodiment shown in FIGS. 10 and 11, a single switch 17b may be used in the modulator to receive the video and both audio inputs. Switch 17b toggles between three input positions: video, first audio and second audio, with the default position being the video. Switch 17b toggles twice during each active video line (synchronization interval), once at the beginning for insertion of a sample of one of the audio inputs, and once at the end for insertion of a sample of the other audio input. Similarly, a single switch 23b may be provided in the demodulator to remove the two audio samples from each active video line. Switch 23b has three output positions: video, first audio and second audio, with the default position being the video. Switch 23b also toggles twice during each active video line, once at the beginning for removal of a sample of one of the audio inputs, and once at the end for removal of a sample of the other audio input.

Figure 12:
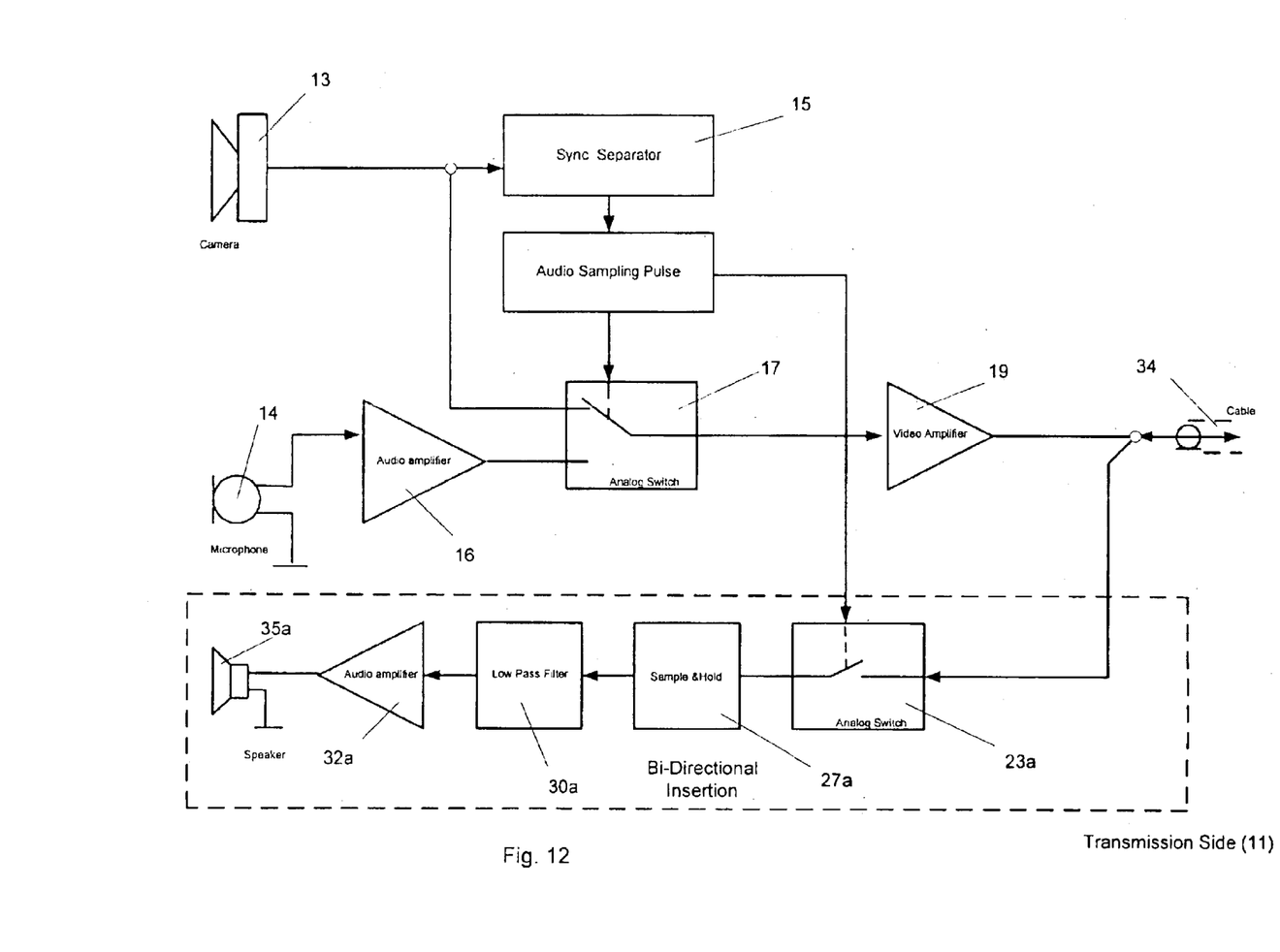
FIG. 12 is a simplified block diagram of the modulator (transmission side) of the system of the present invention illustrating a bi-directional audio transmission embodiment.
Figure 13:
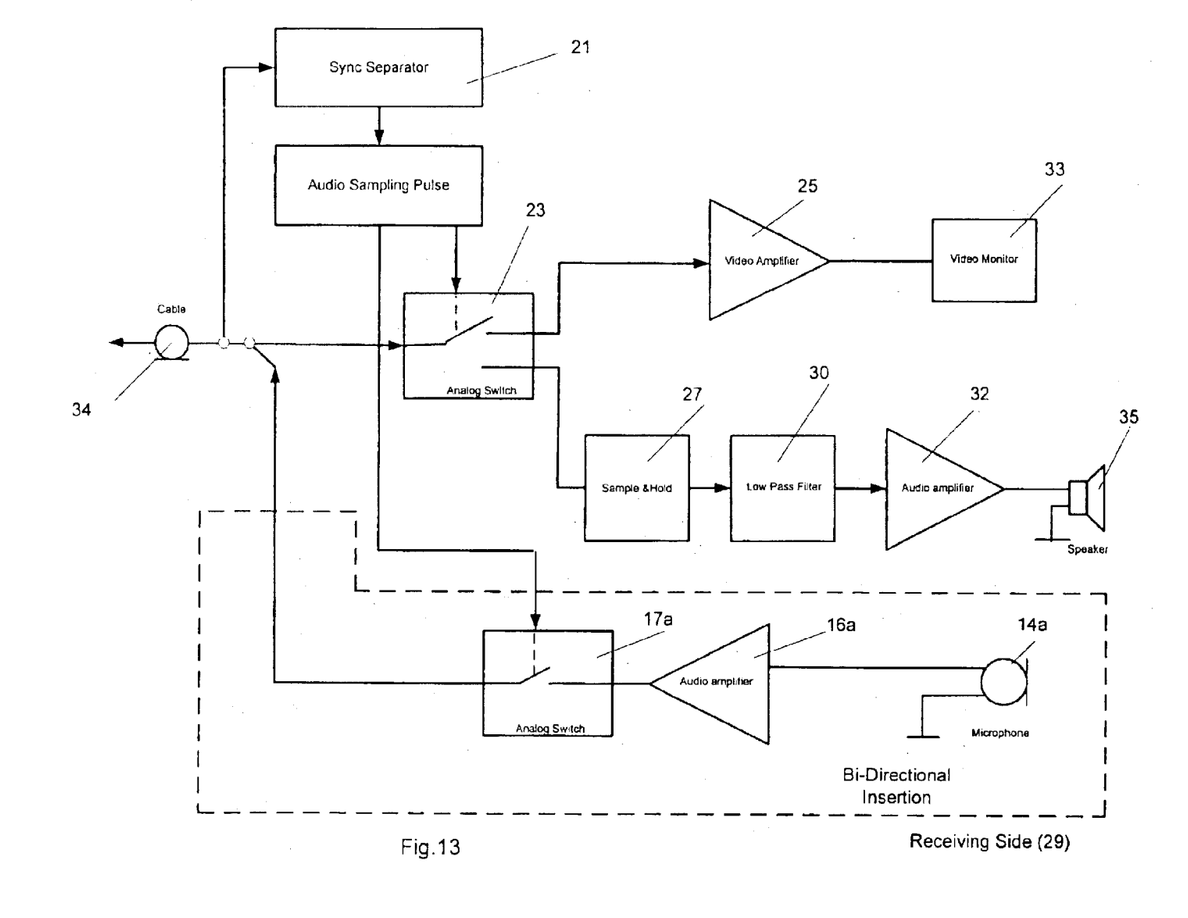
FIG. 13 is a simplified block diagram of the demodulator (receiving side) of the system of the present invention illustrating a bi-directional audio transmission embodiment.

In another alternative embodiment, bi-directional communications may be established by providing an audio source 14a, amplifier 16a, and switch 17a in demodulator 29; and by providing switch 23a, hold 27a, filter 30a, amplifier 32a and speaker 35a in modulator 11 as shown in FIGS. 12–13.

The present invention can also be utilized to transmit analog or digital signals or information other than, or in addition to, audio signals in the same manner as described herein.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An apparatus for transmitting an audio signal over a dedicated video transmission line in a closed circuit television system comprising:
   a. a modulator having an audio input, a video input, and a first synchronization device all attached to a first switching device capable of toggling between said video input and said audio input, said first switching device having an output;
   b. a demodulator having an audio output, a video output, and a second synchronization device all attached to a second switching device capable of toggling between said video output and said audio output, said second switching device having an input; and
   c. a single transmission line connecting the output from said first switching device to the input of said second switching device
   wherein said first and second synchronization devices are identically synchronized with each other, audio signal samples are inserted into the beginnings of the active video scan lines of a video signal at regular intervals according to said first synchronization device through the toggling action of said first switching device in said modulator, and said audio signal samples are removed from the beginnings of the active video scan lines of the video signal at regular intervals according to said second synchronization device through the toggling action of said second switching device in said demodulator.

2. The apparatus of claim 1 wherein the default position of said first switching device is to the video input, and the default position of said second switching device is to the video output.

3. The apparatus of claim 2 wherein each of said audio input, video input, audio output, video output, first switching device and second switching device is analog.

4. The apparatus of claim 1 wherein a signal holding device is provided at the audio output from said second switching device for maintaining the audio signal between samples, and a low pass filter is provided at the output from said holding device.

5. The apparatus of claim 4 wherein a first audio amplifier is provided in the modulator between said audio input and said first switching device, a second audio amplifier is provided in the demodulator at the output from said low pass filter, a first video amplifier is provided in the modulator at the output from said first switching device, and a second video amplifier is provided in the demodulator at the video output from said second switching device.

6. The apparatus of claim 5 wherein the synchronization pulse for said modulator and said demodulator is approximately one microsecond.

7. An apparatus for transmitting an analog audio signal over a dedicated video transmission line in a closed circuit television system comprising:
   a. a modulator having an analog audio input, an analog video input, and a first synchronization device all attached to a first analog switching device capable of toggling between said video input and said audio input, the default position being the video input, said first switching device having an analog output;
   b. a demodulator having an analog audio output, an analog video output, and a second synchronization device all attached to a second analog switching device capable of toggling between said video output and said audio output, the default position being the video output, said second switching device having an analog input; and
   c. a single transmission line connecting the output from said first switching device to the input of said second switching device
   wherein said first and second synchronization devices are identically synchronized with each other, audio signal samples are inserted into the endings of the active video scan lines of a video signal at regular intervals according to said first synchronization device through the toggling action of said first switching device in said modulator, and said audio signal samples are removed from the endings of the active video scan lines of the video signal at regular intervals according to said second synchronization device through the toggling action of said second switching device in said demodulator.

8. The apparatus of claim 7 wherein a signal holding device is provided at the audio output from said second switching device for maintaining the audio signal between samples, and a low pass filter is provided at the output from said holding device.

9. The apparatus of claim 7 wherein said modulator is provided with a second analog audio input connected to said first switching device, and said first switching device is capable of toggling among said video input, said first audio input and said second audio input, the default position being the video input; said demodulator is provided with a second audio output attached to said second switching device, and said second switching device is capable of toggling between said video output said first audio output, and said second audio output, the default position being the video output; wherein audio signal samples from said second audio input are inserted into the beginnings of said active video scan lines at regular intervals according to said first synchronization device through the toggling action of said first switching device in said modulator, and said second audio signal samples are removed from the beginnings of the active video scan lines at regular intervals according to said second synchronization device through the toggling action of said second switching device in said demodulator.

10. The apparatus of claim 9 wherein a second signal holding device is provided at the second audio output from said second switching device for maintaining the second audio signal between samples, and a second low pass filter is provided at the output from said second holding device.

11. An apparatus for transmitting dual analog audio signals over a dedicated video transmission line comprising:
  a. a modulator having first and second analog audio inputs, an analog video input, first and second analog switching devices each having an output, and a first synchronization device wherein said synchronization device and said first and second audio inputs are attached to said first switching device, and wherein the output of said first switching device, said video input and said synchronization device are attached to said second switching device;
  b. a demodulator having first and second analog audio outputs, an analog video output, third and fourth analog switching devices each having an input, and a second synchronization device wherein said video output, the input to said fourth switching device and said synchronization device are attached to said third switching device, and wherein said first and second audio outputs and said synchronization device are attached to said fourth switching device; and
  c. a single transmission line connecting the output from said second switching device to the input of said third switching device
  wherein said first and second synchronization devices are identically synchronized with each other, audio signal samples from said first audio input are inserted into the endings of the active video scan lines of a video signal at regular intervals according to said first synchronization device through the toggling action of said first and second switching devices in said modulator, and said audio signal samples are removed from the endings of the active video scan lines of the video signal at regular intervals according to said second synchronization device through the toggling action of said third and fourth switching devices in said demodulator, and wherein audio signal samples from said second audio input are inserted into the beginnings of said active video scan lines at regular intervals according to said first synchronization device through the toggling action of said first and second switching devices in said modulator, and said second audio signal samples are removed from the beginnings of the active video scan lines at regular intervals according to said second synchronization device through the toggling action of said third and fourth switching devices in said demodulator.

12. The apparatus of claim 11 wherein a second signal holding device is provided at the second audio output from said fourth switching device for maintaining the second audio signal between samples, and a second low pass filter is provided at the output from said second holding device.

13. An apparatus for transmitting dual analog audio signals over a dedicated video transmission line comprising:
  a. a modulator having first and second analog audio inputs, an analog video input, first and second analog switching devices each having an output, and a first synchronization device wherein said synchronization device and said first and second audio inputs are attached to said first switching device, and wherein the output of said first switching device, said video input and said synchronization device are attached to said second switching device;
  b. a demodulator having, first and second analog audio outputs, an analog video output, third and fourth analog switching devices each having an input, and a second synchronization device wherein said video output, the input to said fourth switching device and said synchronization device are attached to said third switching device, and wherein said first and second audio outputs and said synchronization device are attached to said fourth switching device; and
  c. a single transmission line connecting the output from said second switching device to the input of said third switching device wherein said first and second synchronization devices are identically synchronized with each other, audio sisal samples from said first audio input are inserted into the beginnings of the active video scan lines of a video signal at regular intervals according to said first synchronization device through the toggling action of said first and second switching devices in said modulator, and said audio signal samples are removed from the beginnings of the active video scan lines of the video signal at regular intervals according to said second synchronization device through the toggling action of said third and fourth switching devices in said demodulator, and wherein audio signal samples from said second audio input are inserted into the endings of said active video scan lines at regular intervals according to said first synchronization device through the toggling action of said first and second switching devices in said modulator, and said second audio signal samples are removed from the endings of the active video scan lines at regular intervals according to said second synchronization device through the toggling action of said third and fourth switching devices in said demodulator.

14. A method for transmitting an analog audio signal over a dedicated video transmission line in a closed circuit television system comprising the steps of:

a. inputting a synchronized analog video signal to a switching device in a modulator;

b. inputting an analog audio input signal to said switching device;

c. inserting samples of said audio input signal into the beginnings of the active video scan lines of the video signal at regular synchronized intervals through the toggling action of said switching device creating a combined signal;

d. transmitting said combined signal from said modulator through a dedicated transmission line to a demodulator;

e. removing the samples of said audio signal from the beginnings of said active video scan lines at regular identically synchronized intervals through the toggling action of a second switching device in said demodulator;

f. outputting the video signal from said second switching device to a video monitor; and     g. outputting the removed samples of said audio signal from said second switching device.

15. The method of claim 14 including the additional steps of:

h. transmitting the audio signal output from said second switching device through a signal holding device for maintaining the audio signal between samples; and     i. transmitting the output from said signal holding device through a low pass filter.

16. The method of claim 15 including the additional steps of:

j. inputting a second analog audio input signal to said switching device;

k. inserting samples of said second audio input signal into the endings of the active video scan lines of the video signal at regular synchronized intervals through the toggling action of said switching device creating a combined signal;

l. removing the samples of said second audio signal from the endings of a active video scan lines at regular identically synchronized intervals through the toggling action of said second switching device in said demodulator; and     m. outputting the removed samples of said second audio signal from said second switching device.

17. An apparatus for transmitting bi-directional audio signals over a dedicated video transmission line comprising:

a. a modulator having an audio input, a video input, and a first synchronization device all attached to a first switching device capable of toggling between said video input and said audio input, said first switching device having an output;

b. a demodulator having an audio output, a video output, and a second synchronization device all attached to a second switching device capable of toggling between said video output and said audio output, said second switching device having an input;

c. a single transmission line connecting the output from said first switching device to the input of said second switching device; d. a third switching device in said demodulator attached to said second synchronization device and to a second audio input, said third switching device having an output connected to said transmission line; and     e. a fourth switching device in said modulator attached to said first synchronization device and to a second audio output, said fourth switching device having an input connected to said transmission line;

wherein said first and second synchronization devices are identically synchronized with each other, first direction audio signal samples are inserted into the beginnings of the active video scan lines of the video signal at regular intervals according to said first synchronization device through the toggling action of said first switching device in said modulator, and said first direction audio signal samples are removed from the beginnings of the active video scan lines of the video signal at regular intervals according to said second synchronization device through the toggling action of said second switching device in said demodulator;

and wherein opposite direction audio signal samples are inserted into the endings of the active video scan lines of the video signal at regular intervals according to said second synchronization device through the toggling action of said third switching device in said demodulator, and said opposite direction audio signal samples are removed from the endings of the active video scan lines of the video signal at regular intervals according to said first synchronization device through the toggling action of said fourth switching device in said modulator.

18. An apparatus for transmitting bi-directional audio signals over a dedicated video transmission line comprising:

a. a modulator having an audio input, a video input, and a first synchronization device all attached to a first switching device capable of toggling between said video input and said audio input, said first switching device having an output;

b. a demodulator having an audio output, a video output, and a second synchronization device all attached to a second switching device capable of toggling between said video output and said audio output, said second switching device having an input;

c. a single transmission line connecting the output from said first switching device to the input of said second switching device;

d. a third switching device in said demodulator attached to said second synchronization device and to a second audio input, said third switching device having an output connected to said transmission line; and     e. a fourth switching device in said modulator attached to said first synchronization device and to a second audio output, said fourth switching device having an input connected to said transmission line;

wherein said first and second synchronization devices are identically synchronized with each other, first direction audio signal samples are inserted into the endings of the active video scan lines of the video signal at regular intervals according to said first synchronization device through the toggling action of said first switching device in said modulator, and said first direction audio signal samples are removed from the endings of the active video scan lines of the video signal at regular intervals according to said second synchronization device through the toggling action of said second switching device in said demodulator;

and wherein opposite direction audio signal samples are inserted into the beginnings of the active video scan lines of the video signal at regular intervals according to said second synchronization device through the toggling action of said third switching device in said demodulator, and said opposite direction audio signal samples are removed from the beginnings of the active video scan lines of the video signal at regular intervals according to said first synchronization device through the toggling action of said fourth switching device in said modulator.

19. A method for transmitting bi-directional audio signals over a dedicated video transmission line comprising the steps of:

a. inputting a synchronized video signal to a switching device in a modulator;

b. inputting an audio input signal to said switching device;

c. inserting samples of said audio input signal into the beginnings of the active video scan lines of the video signal at regular synchronized intervals through the toggling action of said switching device creating a combined signal;

d. transmitting said combined signal from said modulator through a dedicated transmission line to a demodulator;

e. removing the samples of said audio signal from the beginnings of said active video scan lines at regular identically synchronized intervals through the toggling action of a second switching device in said demodulator;

f. outputting the video signal from said second switching device to a video monitor;

g. outputting the removed samples of said audio signal from said second switching device;

h. inputting a second audio input signal to a third synchronized switching device in said demodulator;

i. inserting samples of said second audio input signal into the endings of the active video scan lines of the video signal at regular synchronized intervals through the toggling action of said third switching device to create a second audio signal;

j. transmitting said second audio signal from said demodulator through a dedicated transmission line to said modulator;

k. removing the samples of said second audio signal from the endings of said active video scan lines at regular identically synchronized intervals through the toggling action of a third switching device in said modulator; and l. outputting the removed samples of said second audio signal from said second switching device.

* * * * *